B. H. SMITH.
WING NUT.
APPLICATION FILED JAN. 16, 1919.
1,393,459. Patented Oct. 11, 1921.
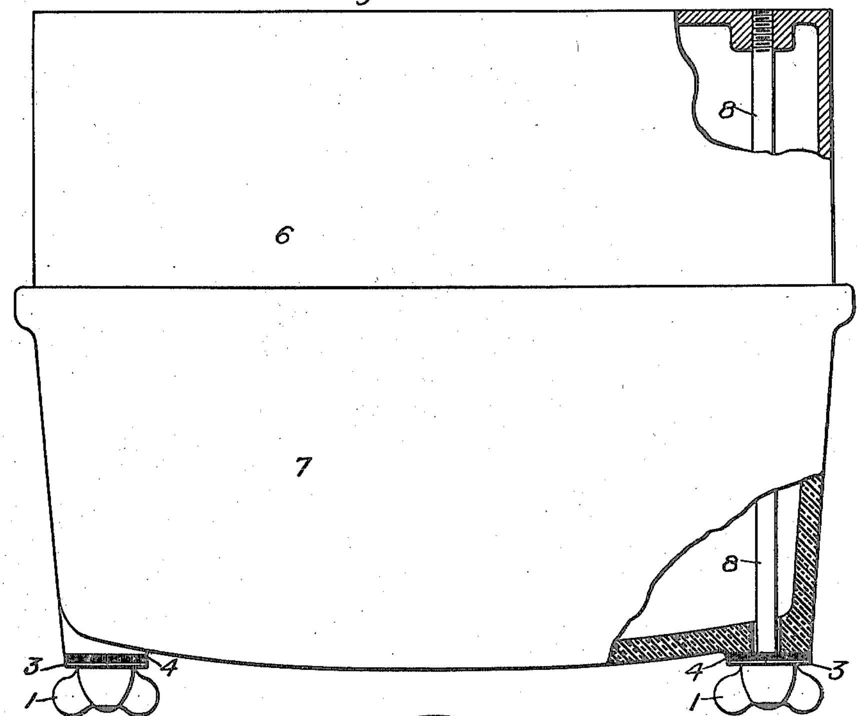
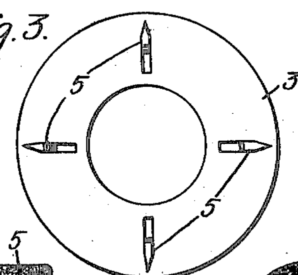
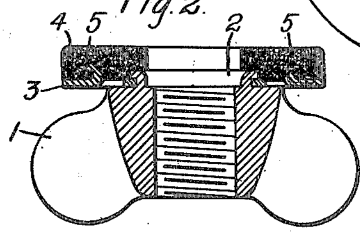
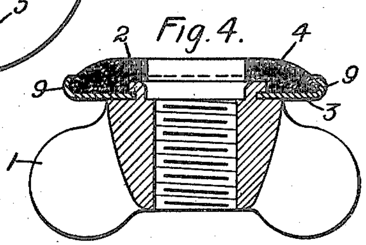
WITNESSES:
J. A. Helsel.
[signature]
INVENTOR
Benjamin H. Smith.
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTINGHOUSE ELECTRIC & MANUFACTURING COMPANY, A CORPORATION OF PENNSYLVANIA.

WING-NUT.

1,393,459. Specification of Letters Patent. Patented Oct. 11, 1921.

Application filed January 16, 1919. Serial No. 271,436.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Wing-Nuts, of which the following is a specification.

My invention relates to clamping devices and particularly to wing-nuts and similar devices.

The object of my invention is to provide a device, of the above indicated character, that shall be simple and durable in construction and have permanently-related, relatively-movable means thereon that constitute packing, gripping and cushioning means therefor.

In practising my invention, I provide a nut of usual function, preferably a wing-nut, and means for supporting a relatively-rotative yieldable washer thereon, whereby a unitary device is obtained for performing all of the functions of the usually separate members.

The device is particularly adaptable for use in clamping fragile objects, such as the glass covers of electrical meters, wherefor dust proof and readily-removable retaining means having a gentle, but firm, clamping action is desirable.

Figure 1 of the accompanying drawings is a partially-broken outline view of a meter casing with which wing-nuts embodying my invention may be employed; Fig. 2 is an enlarged sectional detail view of one of the nuts shown in Fig. 1; Fig. 3 is a detail plan view of a part of the device shown in Fig. 2, and Fig. 4 is a view, similar to Fig. 2, of a wing-nut embodying a modified form of my invention.

A wing-nut 1, of usual form but having an annular flange 2 on its clamping surface, surrounding its opening, is provided with a relatively thin and centrally-apertured metal washer 3, loosely embracing the flange 2. The flange 2 is initially of plain cylindrical or ring shape and swaged outwardly, as indicated, after the washer 3 is placed in position.

A felt, or similar, washer 4 is secured to the washer 3, as shown in Fig. 2, by a plurality of gripping-projections 5, punched and bent from the washer 3, as shown more clearly in Figs. 2 and 3. The washers 3 and 4 and the flange 2 may be of slightly greater diameter than the opening in the nut 1 to provide clearance space in mounting the device upon a coöperating bolt.

A particular adaptation of the device is illustrated in Fig. 1, in which a meter casing 6, embodying a glass cover 7, is provided with bolts 8 for the reception of the nuts 1.

A modified form of nut embodying my invention is illustrated in Fig. 4, in which the nut 1 is constructed similarly to the device above mentioned, with the exception that the washer 3 is annularly crimped to form a flange 9 projecting over the edges of the washer 4.

The devices, above described, provide compact and effective unitary structures embodying all of the advantages and none of the disadvantages of the usually separate members that ordinarily are difficult to handle and liable to loss.

While I have shown and described particular forms of my invention, changes may be effected therein without departing from the spirit and scope thereof, as set forth in the appended claims.

I claim as my invention:

1. In a clamping device, the combination with a screw-threaded member and a frangible member, of a nut device for coöperation with said screw-threaded member comprising an interiorly-threaded body member, a yieldable washer for engagement with said frangible member, and a relatively-thin washer of pliable material mounted rotatably on said body member having a portion bent into holding relation to said yieldable washer.

2. The combination with a screw-threaded holding member and a yieldable member for cushioning the holding surface thereof, of a member of relatively-thin pliable material relatively-movably mounted on said screw-threaded member having a portion bent into holding relation to said yieldable member for preventing separation of the latter from the relatively movable member.

3. The combination with a holding member, a yieldable member for cushioning the holding surface thereof, and a member relatively-movably mounted on said holding member, of means engaging the yielding member at a point removed from the holding surface thereof for readily-removably securing said yieldable member in position on said relatively-movable member.

4. In a clamping device for securing a frangible member in operative position, the combination with a main body member and a member relatively-movably mounted thereon, of a member of yieldable material disposed on the relatively-movable member for engagement with the frangible member to prevent fracture thereof and means engaging the yieldable member at a point beneath the holding surface of the yieldable member for preventing separation of the yieldable member and the relatively movable member.

5. In a clamping device, the combination with a member and a frangible member for attachment thereto, of securing means for said members providing a moisture and dust-proof joint therebetween and compensating temperature changes to prevent fracture of the frangible member comprising a holding member, a coöperating member therefor, a member relatively-movably disposed on said coöperating member and a yieldable member disposed on said relatively-movable member for pressing engagement with said frangible member.

6. The combination with a holding member, a yieldable member for cushioning the holding surface thereof, and a member relatively movably mounted on said holding member and having up-struck securing means penetrating the said yieldable member.

In testimony whereof, I have hereunto subscribed my name this 28th day of Dec., 1918.

BENJAMIN H. SMITH.